United States Patent
Inkpen Quinn et al.

(10) Patent No.: US 9,591,260 B1
(45) Date of Patent: Mar. 7, 2017

(54) IMMERSIVE TELEPRESENCE

(71) Applicant: Microsoft Technology Licensing, LLC, Redmond, WA (US)

(72) Inventors: Kori Inkpen Quinn, Redmond, WA (US); Meredith Morris, Bellevue, WA (US); Gina Venolia, Bellevue, WA (US); John Tang, Palo Alto, CA (US); Lilian de Greef, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/957,882

(22) Filed: Dec. 3, 2015

(51) Int. Cl.
*H04N 7/14* (2006.01)
*G06F 3/0482* (2013.01)
*G06F 3/0484* (2013.01)

(52) U.S. Cl.
CPC ........... *H04N 7/142* (2013.01); *G06F 3/0482* (2013.01); *G06F 3/0484* (2013.01)

(58) Field of Classification Search
CPC ....................................................... H04N 7/14
USPC ................... 348/14.01, 14.02, 14.03, 14.05
See application file for complete search history.

(56) References Cited

U.S. PATENT DOCUMENTS

| | | | |
|---|---|---|---|
| 7,587,747 B2 | 9/2009 | Maguire, Jr. | |
| 7,631,261 B2 | 12/2009 | Williams et al. | |
| 7,949,616 B2 * | 5/2011 | Levy | B25J 9/1689 706/11 |
| 8,471,888 B2 | 6/2013 | George et al. | |
| 8,860,787 B1 | 10/2014 | Neven | |
| 2015/0381930 A1 | 12/2015 | Quinn et al. | |

OTHER PUBLICATIONS

Balfour, et al., "The What, Why and How of Achieving Urban Telepresence", In Proceedings of IEEE Long Island Systems, Applications and Technology Conference, May 3, 2013, 6 pages.
Cisco, "Innovation in Accessibility", Published on: May 13, 2013, Available at: http://www.cisco.com/web/about/responsibility/accessibility/CiscoAccessibilityBrochure.pdf.
Donnelly, Martin, "DigiCULT Technology Watch Briefing Telepresence, Haptics, Robotics", In Publication of DigiCULT Technology Watch Briefing, Apr. 2004, pp. 1-64.
(Continued)

*Primary Examiner* — Olisa Anwah
(74) *Attorney, Agent, or Firm* — Alin Cerie; Cassandra T. Swain; Micky Minhas

(57) ABSTRACT

In general, the immersive telepresence implementations described herein allow desired telepresence experiences of users or telepresence travel participants to be automatically matched with travel volunteers that can provide these telepresence experiences. The mobile computing devices of the travel volunteers provide audio, video and other data to the travel participant so that the travel participant can experience the sights and sounds of a desired telepresence experience (which can include location and time, as well as a desired activity) without the travel participant physically being present. The immersive telepresence implementations described herein automatically find matches between telepresence experiences on a list (e.g., bucket list) of a travel participant and one or more travel volunteers and provide for various features to provide an immersive and personalized telepresence experience for the travel participant.

20 Claims, 9 Drawing Sheets

(56) References Cited

OTHER PUBLICATIONS

Dumais, S. T., et al., "Implicit Queries (IQ) for Contextualized Search", In SIGIR 2004 Proceedings, Jul. 2004, p. 594.

Gaemperle, et al., "An Immersive Telepresence System using a Real-Time Omnidirectional Camera and a Virtual Reality Head-Mounted Display", In Proceedings of IEEE International Symposium on Multimedia, Dec. 10, 2014, pp. 175-178.

Jouppi, Norman P., "First Steps towards Mutually-Immersive Mobile Telepresence", In Proceedings of ACM Conference on Computer-Supported Cooperative Work, Nov. 16, 2002, 10 pages.

Okura, et al., "Fly-through Heijo Palace Site Historical Tourism System Using Augmented Telepresence", In Proceedings of ACM Multimedia, Oct. 29, 2012, 2 pages.

Rodrigues, Filipe André Cachada, "Immersive Telerobotic Modular Framework using Stereoscopic HMD's", In Master Thesis of Engineering College Harbor University, Jan. 2015, 110 pages.

Sambhanthan, et al., "Enhancing Tourism Destination Accessibility in Developing Countries through Virtual Worlds", In Journal of Computing Research Repository, Jun. 2013, 15 pages.

Nissner-Gross, et al., "Participatory Telerobotics", In Proceedings of SPIE, vol. 8758, May 28, 2013, 6 pages.

\* cited by examiner

IMMERSIVE TELEPRESENCE

BACKGROUND

There are various scenarios where a person may want to view a far away locale, but may not be able to do so themselves. For example, many older or disabled people are homebound or confined to a hospital bed making it impossible for them to travel to locations they wish to see or participate in experiences they wish to experience. As another example, natural disasters such as floods, fires and earthquakes often make it difficult for rescue personnel to enter a given location because roads are impassible or there is no ingress available to remote locations. Similarly, in armed conflicts or scenes of terrorist acts it is often impossible for groups of people to enter the location of conflict or crime because it is not possible to freely move personnel into the area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the immersive telepresence implementations described herein allow desired telepresence experiences of users or telepresence travel participants (sometimes called travel participants herein) to be automatically matched with travel volunteers that can provide these telepresence experiences. The mobile computing devices of the travel volunteers provide audio, video and other data to the travel participant so that the travel participant can experience the sights and sounds of a desired telepresence experience (which can include location and time, as well as a desired activity) without the travel participant physically being present. The immersive telepresence implementations described herein automatically find matches between telepresence experiences on a list (e.g., bucket list) of a travel participant and one or more travel volunteers and provide for various features to provide an immersive and personalized telepresence experience for the travel participant. These features can include, for example, allowing the travel participant to take snap shots of the telepresence experience, creating a scrapbook or photo album of these snap shots, allowing the travel participant to take a picture of themselves appearing to be within the telepresence experience, and automatically searching for information about the telepresence experience using implicit contextualized queries, among others.

DESCRIPTION OF THE DRAWINGS

The specific features, aspects, and advantages of the disclosure will become better understood with regard to the following description, appended claims, and accompanying drawings where:

DETAILED DESCRIPTION

In the following description of immersive telepresence implementations, reference is made to the accompanying drawings, which form a part thereof, and which show by way of illustration examples by which implementations described herein may be practiced. It is to be understood that other embodiments may be utilized and structural changes may be made without departing from the scope of the claimed subject matter.

1.0 Immersive Telepresence Implementations

The following sections provide an overview of the immersive telepresence implementations, an exemplary environment in which immersive telepresence implementations described herein can be implemented, as well as exemplary systems, a process and user interfaces for practicing these implementations.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Overview

Figure 1:
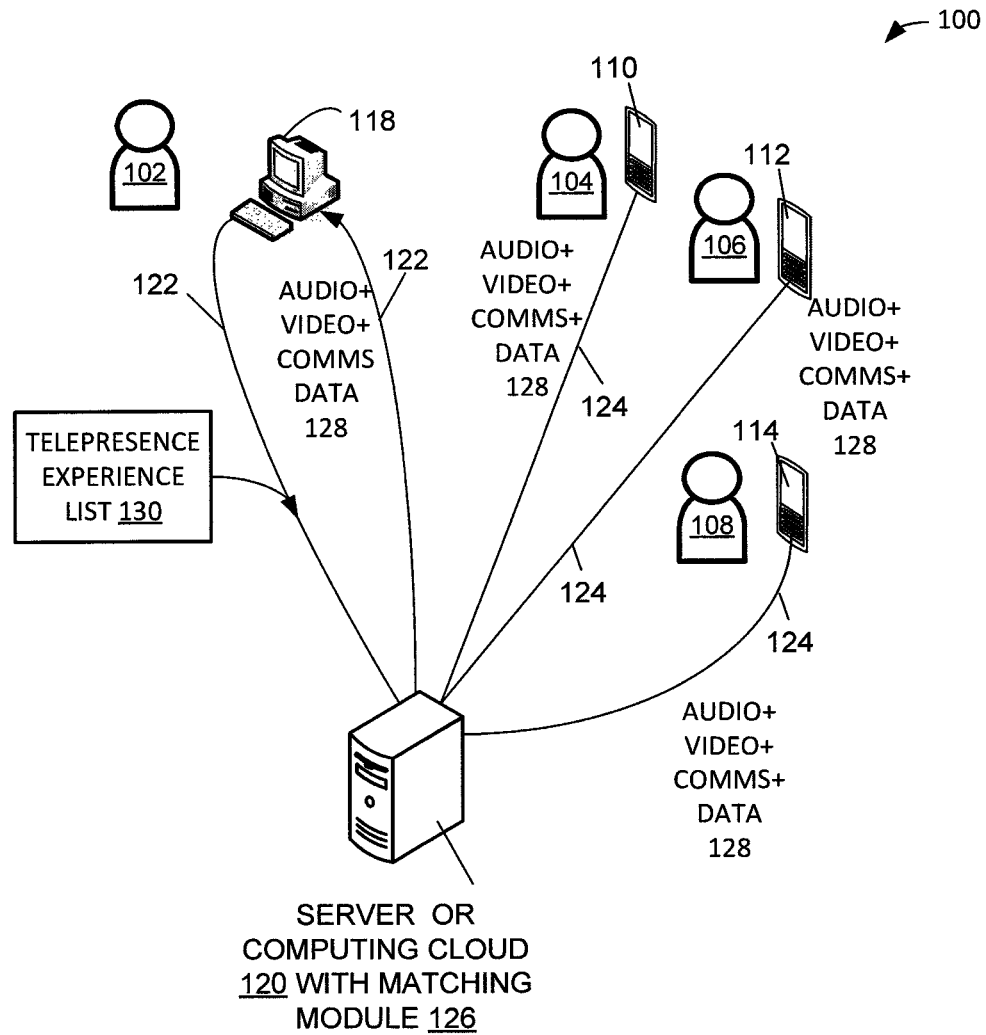
FIG. 1 is an exemplary environment in which immersive telepresence implementations described herein can be practiced.

FIG. 1 shows an exemplary environment 100 for practicing various immersive telepresence implementations as described herein. The environment includes a telepresence travel participant 102, one or more travel volunteers 104, 106, 108, each with a mobile computing device 110, 112, 114, such as, for example, a smart phone, a laptop computer or tablet computing device, each having the capability to capture video and audio and to send and receive other data such as, for example, meta data, text messages and email. The travel participant 102 has a computing device 118 that can also be mobile and that is connected to a server or computing cloud 120 over a network 122 and the mobile computing devices 110, 112, 114 are connected to the computer/computing cloud 120 over a wired or wireless network 124.

A travel participant-travel volunteer matching module 126 that runs on, or in conjunction with, the server/computing cloud 120 automatically matches the desired telepresence experiences from a list 130 (e.g., of a telepresence travel participant 102) with one or more travel volunteers 104, 106, 108 using information extracted from the mobile computing devices 110, 112, 114 of the travel volunteer 104, 106, 108 and the travel participant 102. Details of the matching will be described in greater detail later.

When the travel participant 102 wishes to participate in an immersive telepresence experience the travel participant can generate a list 130 of telepresence experiences (e.g., places, times, activities) the travel participant would like to experience. The travel participant 102 can specify an activity (e.g., hang gliding, visiting the Eiffel tower), a geographic location, and can also specify time, either specifically or generally, for example that they would like to see the sunset over Rio. The telepresence experiences on the list 130 are matched to a travel volunteer 104, 106, 108 by using information extracted from an associated mobile device 110, 112, 114 and also other information. The matching of the experiences on the list to a travel volunteer is performed by using the matching module 126. (e.g., on the server/computing cloud 120). For example, this matching can be performed by using calendar information of each of the travel volunteers and the geographic location of each of the travel volunteers, as well as the profile information of the travel participant 102 and the travel volunteers 104, 106, 108. The calendar and location information can be extracted from the mobile devices 110, 112, 114 of the travel volunteers. Travel volunteers can also fill out profiles with interests and hobbies for experience matching. Detailed calendar data can be pulled from the volunteer's mobile computing device and keywords in appointments can be matched to keywords in desired experiences. Some volunteer activities can also be inferred based on social media check-ins at certain locations, or geolocation provided by a volunteer's mobile computing device or location provided by certain services (i.e., the volunteer is at the coordinates for a hang gliding store, so it can be inferred that the volunteer is about to hang glide.) In some implementations, travel participants can manually initiate matches. For example, after filtering potential matches with some basic constraints (e.g., general available times, language, etc) participants can browse and select from a list of potential telepresence experiences/activities or travel participant/travel volunteer match ups.

Once the matched travel volunteer 104, 106, 108 is at the location of the place on the list that the travel participant 102 wishes to visit (or the travel volunteer is ready to start the experience the travel participant wishes to participate in), the travel volunteer begins a travel session wherein the travel volunteer 104, 106, 108 streams video, associated audio, communications data and possibly other data 128 from the travel volunteer's mobile device 110, 112, 114 over the network to the travel participant 102 via the server/computing cloud 120 so that the travel participant can vicariously experience the sights and sounds of the desired location/activity without actually being physically present. In some implementations, the audio/video/data can be sent directly from the travel volunteer 104, 106, 108 to the travel participant 102 without going through the server/computing cloud 120.

In some implementations, the computing device 118 of the travel participant 102 and the computing devices 110, 112, 114 of the travel volunteers 104, 106, 108 have an application (not shown) on their respective computing devices that allow for the travel participant and the travel volunteers to participate in the telepresence experiences and to communicate with each other over a network. This allows the travel participant 102 to request changes in a telepresence experience in real time and allows the travel participant to provide information to a travel volunteer. The application provides many features that enhance the telepresence experience for both the travel participant and the travel volunteers. Some of the features to increase immersiveness of the telepresence experience for the travel participant can include: (1) the ability for the travel participant to take snap shots of the telepresence experience, for example, by using a "camera" button to take a still photo during the streaming video; (2) the ability to create a photo album of a telepresence experience, (3) the ability for the travel participant to superimpose imagery from the streaming video beyond them to create an image (e.g., that can be shared on social media of them enjoying their "virtual" trip), (4) the ability to automatically search for information about the telepresence experience, for example, via a pane displayed to the travel participant containing implicitly fetched search results displayed to the travel participant that can supplement the travel participant's knowledge of the location of the telepresence experience, and also provide them with insightful information that they may wish to share with the travel volunteer. Queries to find such search results can be triggered by metadata such as any human-typed name for the session or list item (e.g., "the favelas of Rio"), the geo-location being reported by the mobile phone of the travel volunteer, or live speech-to-text translation of any commentary from the travel volunteer, supplemented by entity extraction. In one implementation, the implicit query pane provides a combination of images, text derived from an online document, social media posts, and maps that are relevant to the target location and topics. These features will be described in greater detail later.

One exemplary system for providing immersive telepresence according to the immersive telepresence implementations described herein, comprises one or more computing devices (connected by one or more networks), and a computer program that has a plurality of sub-programs executable by the one or more computing devices. The one or more computing devices are directed by the sub-programs of the computer program to: receive a list of telepresence experiences a telepresence travel participant wishes to experience; match a telepresence experience from the list with a travel volunteer using location and/or calendar information retrieved from a mobile computing device of the travel volunteer; receive video and associated audio of the matched telepresence experience from the mobile computing device of the travel volunteer over a network; and output the received video and associated audio to the telepresence travel participant using immersive features.

Another exemplary system for providing immersive telepresence according to the immersive telepresence implementations described herein, comprises one or more computing devices (connected by one or more networks) and a computer program having a plurality of sub-programs executable by the one or more computing devices that: receive a list of desired telepresence experiences for a telepresence travel participant to visit; match a telepresence experience from the list with the location of a travel volunteer at a point in time using calendar information retrieved from a computing device of the travel volunteer; receive video and associated audio of the matched telepresence experience from the travel volunteer over a network; and output the received video and associated audio of the matched place to the telepresence travel participant. This implementation is advantageous in that it allows a travel participant and a travel volunteer to arrange for an immersive telepresence experience for a time in the future.

One exemplary process for providing immersive telepresence according to the immersive telepresence implementations described herein, comprises using one or more computing devices for: defining a list of telepresence experiences for a telepresence travel participant to experience; matching an telepresence experience from the list with a location of a travel volunteer using calendar information and geographic location on the travel volunteer's mobile computing device; receiving a notice from a travel volunteer that the travel volunteer is able to capture video and audio of the matched telepresence experience; receiving a response to the notice that the telepresence travel participant would like to receive video and audio of the matched place; and sending video and associated audio of the matched telepresence experience from the mobile computing device of the travel volunteer over a network to the travel participant. In some implementations the list of places can be created by a third party instead of a travel participant.

The immersive telepresence implementations described herein are advantageous in that they can provide real-time personalized immersive experiences for home-bound or disabled users in which the user can request a travel volunteer to show them places and experiences that they otherwise might not experience. Additionally, the implementations described herein automatically match a travel participant with a travel volunteer by using location information extracted from the travel volunteers' calendar or geographic location extracted from a mobile computing device of the travel volunteer, as well as by using profile information of the user and the travel volunteer. Furthermore, the immersive telepresence implementations described herein provide many features that allow the user to be immersed in a telepresence experience such as, for example, by taking a still picture/photo of the place they are viewing, by automatically creating a scrapbook of such pictures, taking a photo of themselves in the place they are virtually visiting, and by automatically obtaining information about the location or experience by receiving results in response to automatically submitted context implicit queries (e.g., initiated based on conversations between the travel participant and the travel volunteer, title of the travel session between the travel participant and the travel volunteer, or other meta data derived from the experience). The travel participant can also share these search results with the travel volunteer to make the telepresence experience more informative and enjoyable for both of them.

The immersive telepresence implementations described herein can also have applications in natural disasters or military conflicts where it might be difficult to place people at desired locations so that existing personnel in these locations may be used to provide situation reports. For example, travel volunteers can be automatically matched to locations in areas where natural disasters have occurred and these travel volunteers that are already in place can capture and provide video, audio and other data of their surroundings so that assessments can be made and appropriate aid can be provided.

An overview of various immersive telepresence implementations having been provided, the following sections provide exemplary systems, a process and user interfaces for practicing various immersive telepresence implementations.

1.2 Exemplary Implementations.

Figure 2:
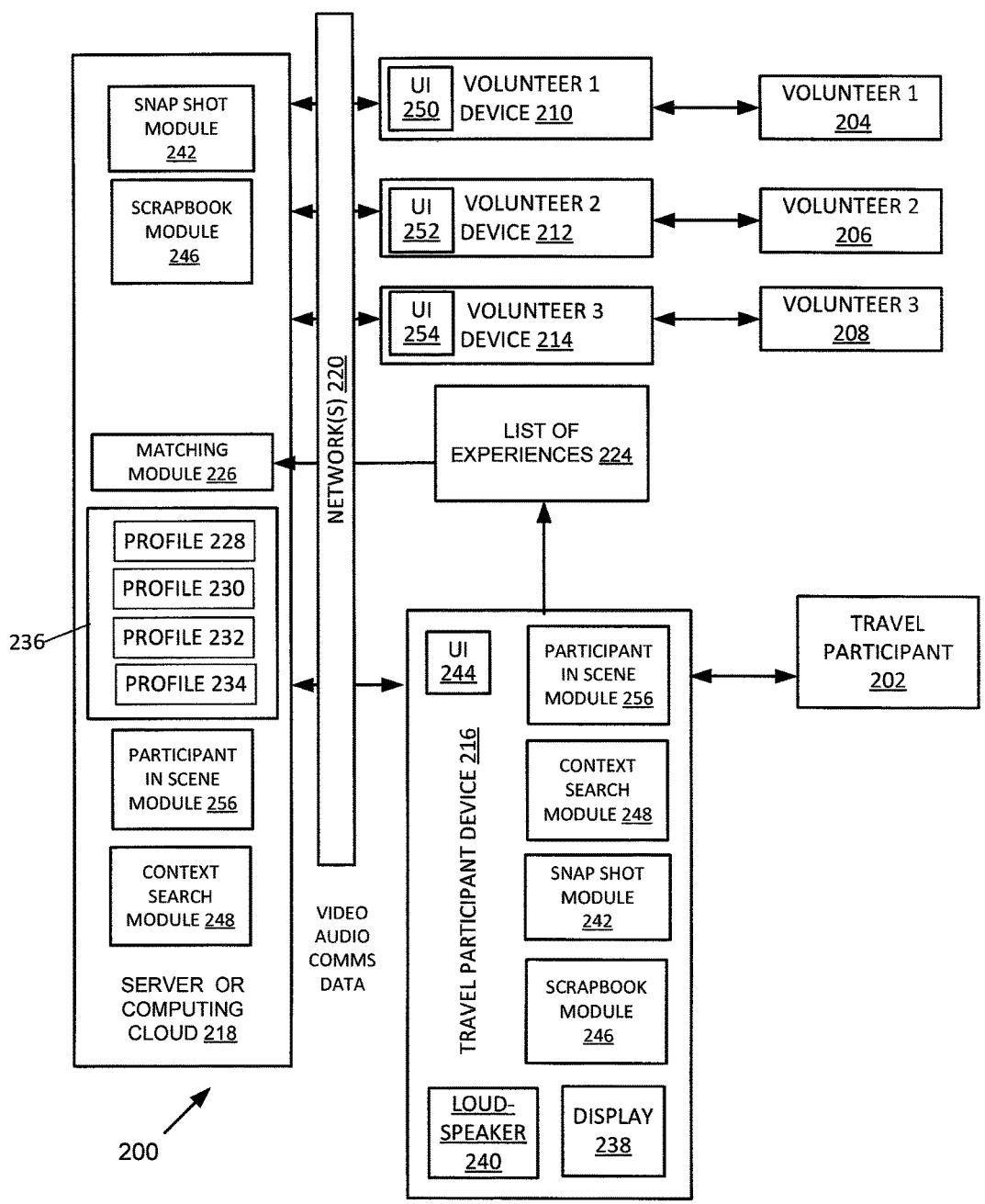
FIG. 2 is a functional block diagram of a system for an exemplary immersive telepresence implementation as described herein.

FIG. 2 depicts a system 200 for providing an immersive telepresence experience to a travel participant 202 by employing one or more travel volunteers 204, 206, 208. The travel participant 202 has a computing device 216, as do the travel volunteers 204, 206, 208 (e.g., mobile computing devices 210, 212, 214, respectively). The computing device 216 of the travel participant 202 and the mobile computing devices 210, 212, 214 of the travel volunteers 204, 206, 208 are in communication with each other, and/or a server or computing cloud 218 over one or more networks 220. It should be noted that while the implementation 200 in FIG. 2 depicts a single travel participant 202, it is possible for multiple travel participants to share a telepresence experience with a travel volunteer (e.g., one travel volunteer can send video, audio and other data to three travel participants, each with their own computing device).

In one implementation, the travel participant 202 generates a list 224 of telepresence experiences that the telepresence travel participant wishes to experience. This list 224 can be generated by specifying the activities, locations and possibly times of the telepresence experiences that the travel participant wishes to experience. For example, the travel participant can specify that they would like to see Manhattan Beach at sunrise, or that they would like to take in the view from the Eiffel Tower in spring. One can sort or filter the list in many ways, e.g., by location, by season, by activity type, by recency of an entry to the list, etc. Each request to be entered on the list can be generated using a template, some components of which may be left blank if they are not relevant. Template items can include, date range, time range, location, activity type and custom notes. There can also be a "take me on an adventure" option which gives the travel volunteer complete freedom to select an activity from a predetermined list. The travel participant 202 can prioritize the list to state which items they would like to experience more than others. For example, the travel participant can mark priority experience with a star to indicate it is a favorite activity.

The travel participant 202 can also generate a user profile 228 in which he or she can specify various pertinent information such as, for example, the language the travel participant speaks, their name, information about their background or situation, their age, their occupation and so forth. Likewise the travel volunteers 204, 206, 208 can specify similar profile information 230, 232, 234 about themselves. These travel participant or travel volunteer profiles can be stored in a profile database 236 and used by a matching module 226 to assist in matching the experiences on the list 224 that the travel participant 202 wishes to experience with a travel volunteer 204, 206, 208.

In some implementations, the matching module 226 on the server/computing cloud 218 matches a telepresence experience (e.g., activity, location, possibly time) from the list 224 of telepresence experiences the telepresence travel participant wishes to experience with the location/time of a travel volunteer 204, 206, 208. This can be done using some or all of the location data, as well as calendar information, retrieved from of the mobile computing device of one or more of the travel volunteers 204, 206, 208, and the profile information 228, 230, 232, 234 of the travel participant and the travel volunteers. For example, a location on the travel participant's list is matched to a location (and optionally time) in the travel volunteer's calendar (e.g., by accessing information such as travel itineraries, scheduled trips, and so forth, on a travel volunteer's mobile computing device) or to the present location of the travel volunteer. Future planned trips of the travel volunteer, extracted from the calendar, can be used to plan a trip with the travel participant. Alternately, the present location of the travel volunteer can be matched with a place on the list. For example, the geographic location of the mobile computing device as measured by a Global Positioning System (GPS) on the device, or other means can be used to match the location of the travel volunteer 204, 206, 208 to a location on the travel participant's list 224. Additionally, the profile information can be used to better match a telepresence experience of a travel participant with a travel volunteer, for example, by matching a travel participant and a travel volunteer that speak the same language. Or the profile information can be used to match a travel participant with a travel volunteer that has the same interests or occupation or other attribute in common. Key words in the travel participant's/travel volunteer's profile and proposed activity descriptions can be used to perform the automatic matching. In some implementations the travel participant and/or travel volunteer are asked to provide scheduling constraints before a match is suggested. A travel volunteer's mobile device's GPS location can also trigger a notification of location-specific experiences in which travel participants may wish to partake. In some immersive telepresence implementations the matching module allows a travel participant to browse a list of available telepresence experiences and manually match a telepresence experience on the list with a travel volunteer. Furthermore, in some immersive telepresence implementations a screening process or a rating system for travel participants and/or travel volunteers can be used.

Once the travel volunteer is selected and is at the location, and possibly the time (e.g., sunrise, sunset, etc.) of the desired telepresence experience and ready to perform the desired activity, video and associated audio of the telepresence experience output from the mobile computing device 210, 212, 214 can be sent over a network 220 and then output to the telepresence travel participant 202. For example, the video can be displayed on a display 238 of the computing device 216 located at the telepresence travel participant and the audio is output over one or more loudspeakers 240 or headsets to the travel participant (and possibly other travel participants that are sharing the travel experience with the travel participant). Other data can also be displayed on the display 238 of the travel participant's computing device 216.

As discussed previously, many features can be implemented to make the telepresence experience more immersive and more personalized for the travel participant. For example, a snap shot module 242 can be implemented on the computer/computing cloud 218 or on the computing device 216 of the travel participant 202 that allows the travel participant to take a snap shot of an image in the video stream that is streamed to the travel participant. In one implementation the travel participant can take a snap shot of an image of the video stream that is displayed to the travel participant by selecting a snap shot button on the user interface 244 displayed to the travel participant from the display 238 associated with the travel participant's computing device 216. This feature will be described in greater detail later.

Another feature that is available is a photo album or scrapbook album feature that automatically formats the snap shots taken by the travel participant 202 into a scrapbook that the travel participant 202 can share with others. Scrapbook processing can be performed in a scrapbook module 246 on the server/computing cloud 218, or on the computing device 216 of the travel participant 202. In some implementations snapshots or photos taken by the travel participant 202 are automatically formatted into a scrapbook using templates. This photo album feature will be described in greater detail later.

Various telepresence implementations allow the telepresence travel participant to create an image or snapshot of themselves that displays the received video as a background behind the telepresence travel participant. This processing can be achieved by employing a participant in scene module 256. The snapshot can be sent or posted to a social media site or used in a variety of other ways that photographs or snapshots can be used. In some implementations live streaming video can be displayed behind the travel participant.

Yet another feature that is available to provide a more immersive and personalized telepresence experience is the automatic retrieval and display of search results related to the context of the telepresence experience. This feature can be implemented by using an implicit context search module 248. In one implementation a pane containing search results fetched in response to an implicit query is displayed to the travel participant. These search results can supplement the travel participant's knowledge of the location of the telepresence experience or the telepresence experience itself and also can provide insightful information that the travel participant 202 may wish to share with the travel volunteer 204, 206, 208. The implicit query or queries can be triggered by metadata such as any human-typed name for the session or list item (e.g., "the favelas of Rio"), the geo-location being reported by the mobile computing device, or live speech-to-text translation of any commentary from the travel volunteer, possibly supplemented by entity extraction. In one implementation, an implicit query pane displayed to the travel participant provides a combination of images, text extracted from online encyclopedias or other documents, social media posts, and maps that are relevant to the target location and topics, among others. This information can also be displayed and manipulated on the travel volunteers' mobile computing devices 210, 212, 214, via user interfaces 250, 252, 254. In some implementations, queries to provide context information can be manually entered by the travel participant.

Figure 3:
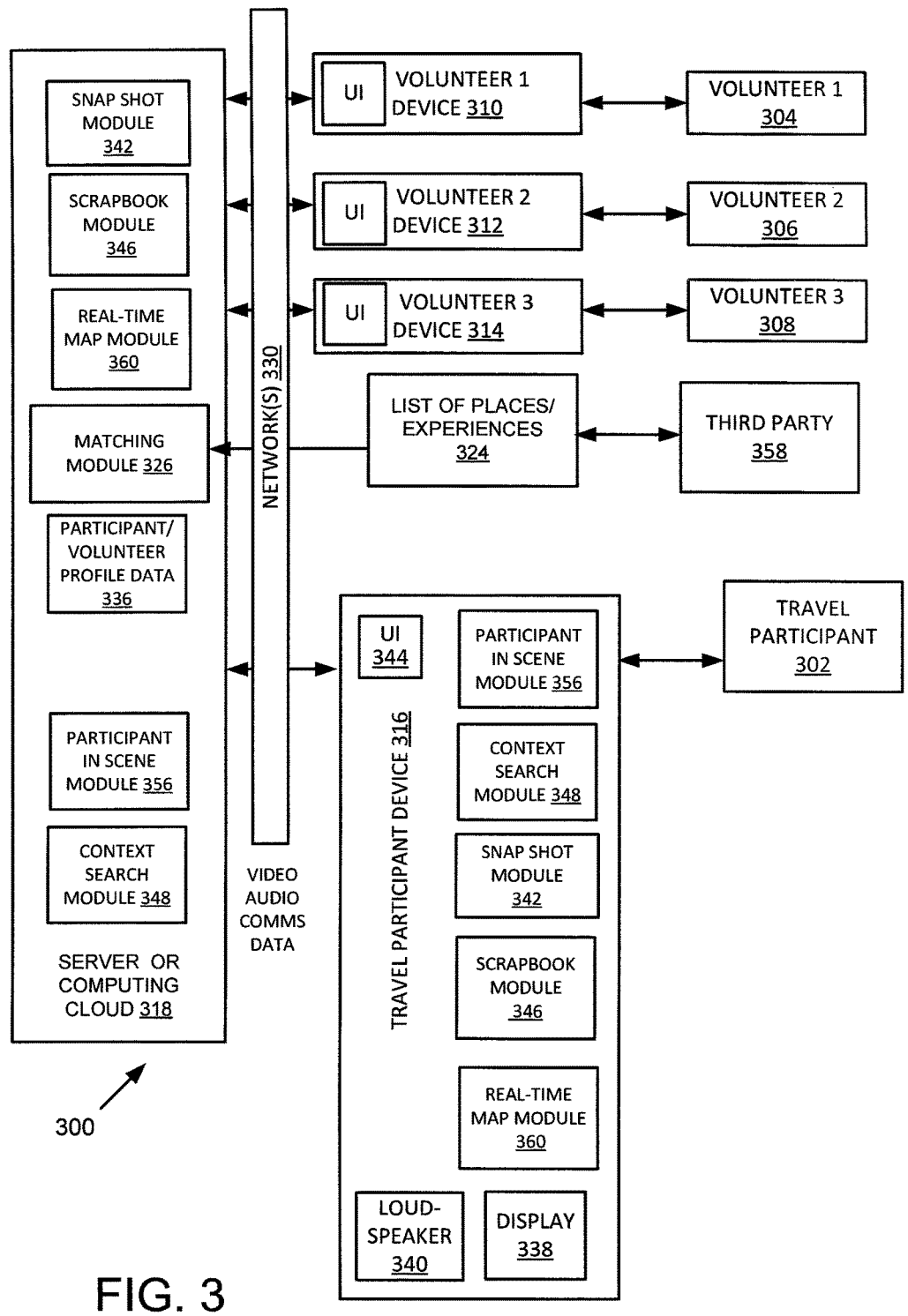
FIG. 3 is a functional block diagram of another system for an exemplary immersive telepresence implementation as described herein.

FIG. 3 depicts another system 300 for practicing various immersive telepresence implementations as described herein. This system differs from the implementation 200 shown in FIG. 2 in that a third party 358 can provide the list 324 of telepresence experiences and this implementation can include a real-time map module 360. The system 300 has one or more computing devices 310, 312, 314, 316, 318 that are in communication with each other over one or more networks 330. Computing device 316 is associated with the travel participant 302. Computing devices 310, 312 and 314 are each associated with a travel volunteer 304, 306, 308. A server/computing cloud 318 is in communication with the travel participant's computer 316, as well as the travel volunteers' computing devices 312, 314, 316. Each of the computing devices have a computer program having a plurality of sub-programs executable by the one or more computing devices on them. This system 300 operates in a manner similar to the implementation 200 shown in FIG. 2, has many of the same components and supports some or all of the same immersive features.

A list 324 of telepresence experiences the telepresence travel participant 302 wishes to experience is generated. This list 324 can be generated by specifying the locations and possibly activities and times the travel participant wishes to experience. In some implementations this list 324 is generated by a third party 358. The third party 358 can prioritize the list to indicate which experiences are higher priority than others, such as, for example, by numbering items on the list or indicating favorites with a star.

The travel participant 302 or the travel volunteers 304, 306, 308 can also generate user profiles 336 in which they can specify various pertinent profile information.

A matching module 326 on the server/computing cloud 318 matches a telepresence experience from the list 324 with the location of a travel volunteer 304, 306, 308. This can be done by using the location of a mobile computing device 310, 312, 314 of the travel volunteers 304, 306, 308 and calendar or time information retrieved from the mobile computing devices of the travel volunteers, as well as the profile information of the travel participant and the travel volunteers. A telepresence experience on the travel participant's list 324 is matched to a location (and optionally time and activity) in the travel volunteer's calendar or time information (e.g., by accessing information such as travel itineraries, scheduled trips, a clock on the device, and so forth) or to the present location of the travel volunteer. Future planned trips of the travel volunteer, extracted from the calendar or provided by the travel volunteer can be used to plan a trip with the travel participant. Alternately, the present location of the travel volunteer can be matched with a place on the list. For example, the geographic location of the mobile computing device as measured by a Global Positioning System (GPS) or other method can be used to match the location of the travel volunteer to a location on the list. Additionally, the profile information can be used to better match a travel participant with a travel volunteer, for example, by matching a travel volunteer to a place on the list 324 based on the skills the travel volunteer has or some other attribute.

Once the travel volunteer 304, 306, 308 is at the location on the list 324, and possibly the time (e.g., sunrise, sunset, etc.), and ready to begin the telepresence session, the travel volunteer 304, 306, 308 can begin to stream audio, video and other data from their mobile computing device 310, 312, 314 to the travel participant's computing device 316 over a network 330. The travel participant's computing device 316 can receive this video, associated audio and data and output it to a display 338 and/or loudspeakers 340. For example, it is displayed on the display 338 located at the telepresence travel participant 302 and output over one or more loudspeakers 340 or headsets to the travel participant 302 (and possibly other travel participants that are sharing the travel experience with the travel participant).

In addition to the features supported by the snapshot module 342, the scrapbook module 346, the participant in scene module 356 and the context search module 348, which operate in a manner as described with respect to FIG. 2, this implementation 300 can also include a real-time map module 360 that can display a real-time map of the travel volunteer and/or the telepresence experience to the travel participant 302 using a real-time map module 360. This real-time map module 360 can reside on the server/computing cloud 318 or on the travel participant's computing device 316. The map can enable the travel participant to contribute to the travel volunteer's experience, for example by offering directions to specific locations or pointing out nearby attractions that the travel volunteer might not be aware of.

Figure 4:
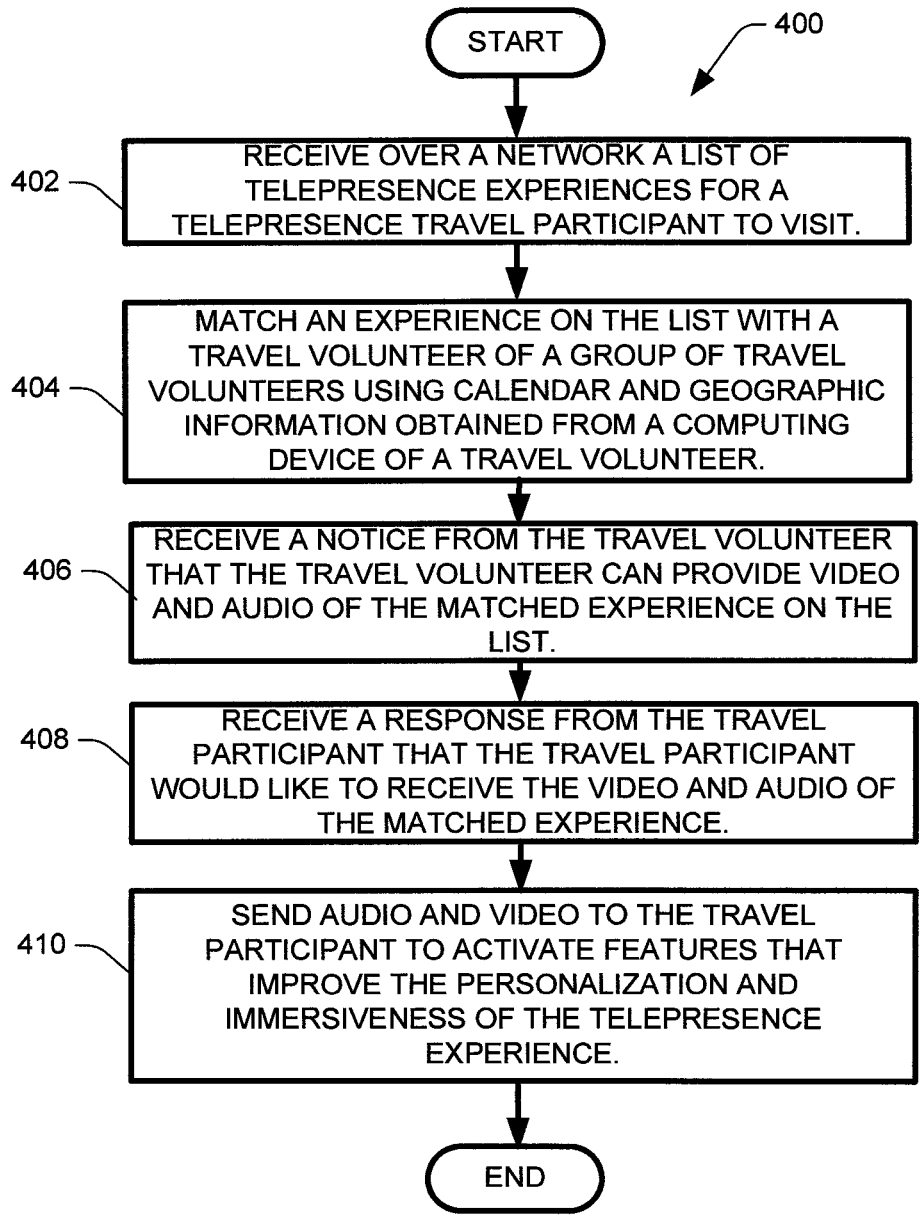
FIG. 4 is an exemplary block diagram of an exemplary process for practicing various exemplary immersive telepresence implementations.

FIG. 4 depicts an exemplary process 400 for practicing various immersive telepresence implementations. As shown in FIG. 4, block 402, a list of desired telepresence experiences (e.g., location, activity, time) for a telepresence travel participant to experience is received. An experience from the list is matched with a location and activity (and possibly schedule) of a travel volunteer using calendar information and geographic location extracted from the travel volunteer's mobile computing device, as shown in block 404. A notice from a travel volunteer that the travel volunteer is able to capture video and audio of the matched telepresence experience is received, as shown in block 406. The notice is responded to by the travel participant, as shown in block 408. Video and associated audio (and other data) of the matched experience is received from the mobile computing device of the travel volunteer over a network and displayed using features that provide immersiveness and personalization, as shown in block 410. Some features are described in the section below.

1.3 Descriptions of Immersive Features

Various immersive telepresence implementations provide features which increase the immersiveness of the telepresence travel experience and personalize it for the travel participant. For example, one feature allows the travel participant to participate in the experience such as, for example, by taking a still picture/photo of the place they are viewing and creating a scrap book of such pictures. Another feature allows a travel participant to take a photo of them in the telepresence experience, while another automatically obtains information about the telepresence experience using automatic context implicit queries. This information can be shared with the travel volunteer. Additionally, one feature displays a real-time map of the location of the travel volunteer during the telepresence experience.

1.3.1 Taking Photographs or Snapshots of the Telepresence Experience

Figure 5:
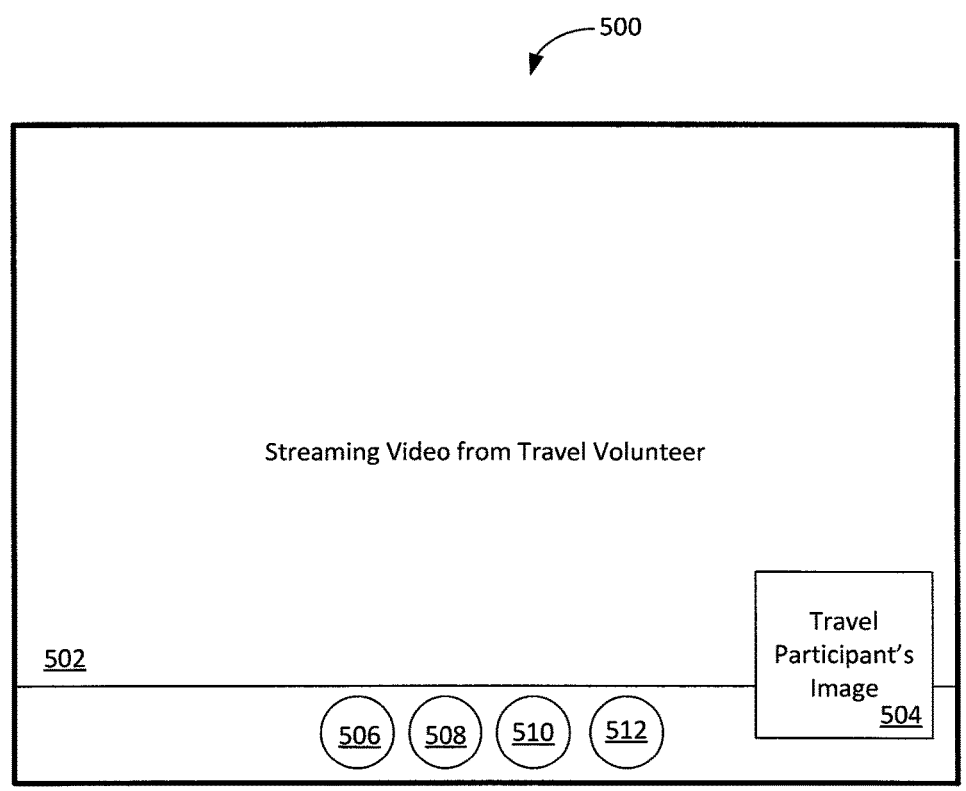
FIG. 5 is an exemplary user interface for taking a snapshot of a telepresence experience that is employed in various exemplary immersive telepresence implementations.

In various immersive telepresence implementations the telepresence travel participant can capture still images of the telepresence experience by taking a snapshot of the video stream that is sent to them by the travel volunteer. In some implementations, as shown in FIG. 5, a user interface 500 is displayed to the travel participant on a display associated with their computing device. In one pane 502 streaming video received from the travel volunteer is displayed. In another pane 504, the travel participant's image is displayed. A virtual snapshot button 506 is also displayed to the travel participant. If the travel participant selects and activates the snapshot button 506 (via a mouse or other pointing device, or via touch if the display is touch sensitive) a snapshot of the displayed streaming video is captured and stored. Furthermore, the other buttons 508, 510, 512 can be used to enact other immersive features, such as, for example, a button 508 to add a snapshot to a scrapbook (e.g., to bring up the interface shown in FIG. 6), a button 510 to capture an image to use as a background for inserting the travel participant in the scene (or otherwise operating in a mode where the travel volunteer can show a view that would be good for a background to insert the travel participant in) or a button 512 to display the search pane for more contextual information about the place being visited. Additional buttons can also include buttons to hang up a video call, mute the microphone used for the video call or any other buttons for typical video calling interfaces.

1.3.2 Creating a Scrapbook

Figure 6:
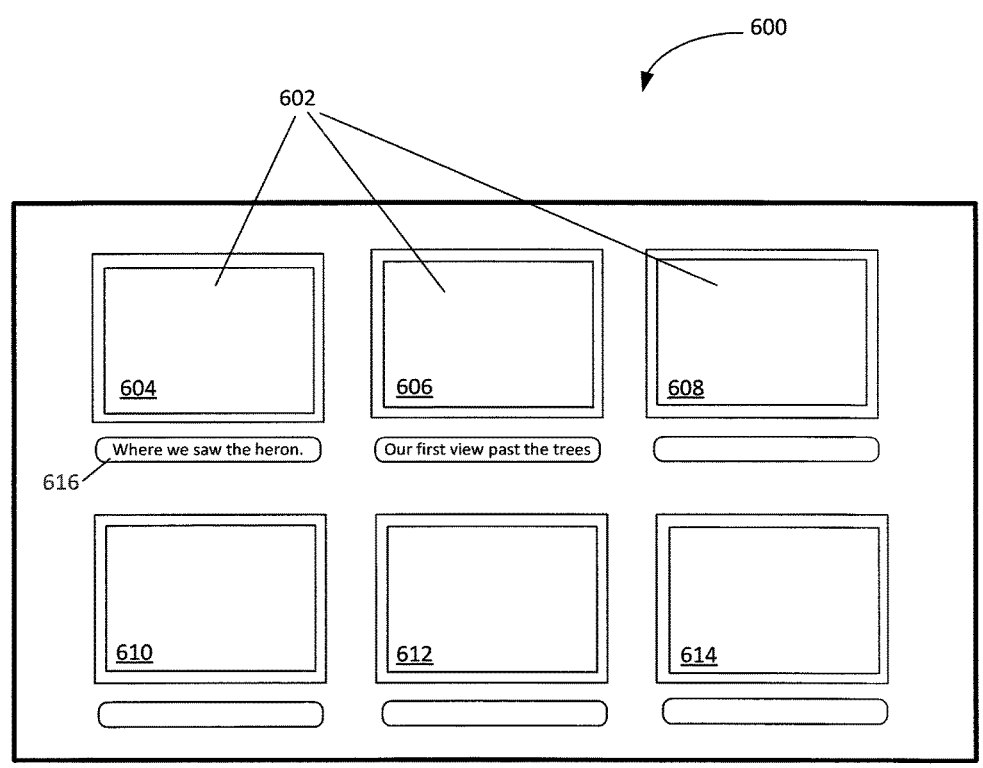
FIG. 6 is an exemplary user interface for automatically creating a scrapbook of snapshots of a telepresence experience that is employed in various exemplary immersive telepresence implementations.

Various telepresence implementations allow the telepresence travel participant to create a scrap book or travel album from multiple captured still images (e.g., captured as described above). This can be done automatically using pre-defined templates and fitting the snap shots the travel participant takes into slots in the pre-defined templates. Such a user interface 600 is shown in FIG. 6. As shown in FIG. 6, snapshots 602 can be automatically filled into slots 604, 606, 608, 610, 612 and 614 on the user interface 600. In one implementation snapshots or still images captured (e.g., by using the snapshot button 510 shown in FIG. 5) during the telepresence experience are automatically inserted into the slots in the order they are captured by the travel participant. The travel participant can change the order of the still image (e.g., via click and drag). Additionally, the travel participant can add text or labels to the images by typing text into a box 616 associated with each image.

1.3.3 Taking a Snapshot of the Travel Participant at the Location

Figure 7:
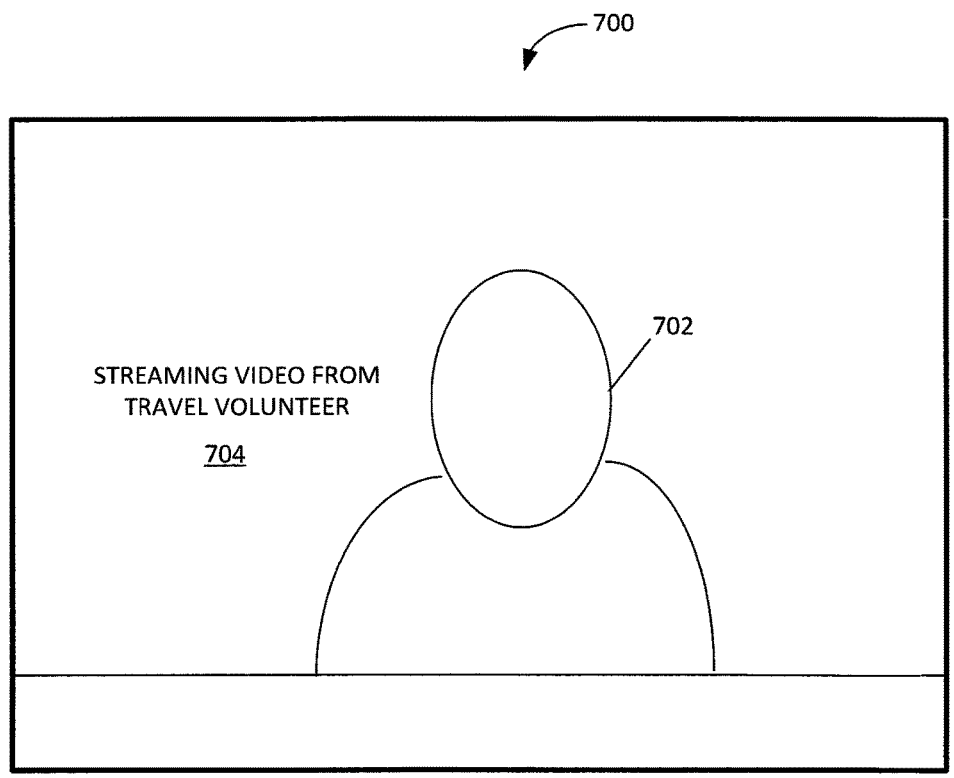
FIG. 7 is an exemplary user interface for automatically creating a snapshot of a travel participant with a background of the telepresence experience that is employed in various exemplary immersive telepresence implementations.

Various telepresence implementations allow the telepresence travel participant to create an image or snapshot of themselves that displays the received video as a background behind the telepresence travel participant. This snapshot can be sent or posted to a social media site or used in a variety of other ways that photographs or snapshots can be used. FIG. 7 shows an exemplary user interface 700 that depicts an image 702 of the travel participant superimposed on a background of the streaming video received from the travel volunteer. In one implementation this image 702 is obtained by segmenting out the foreground of a picture of the travel participant (such as the one captured and displayed in pane 504 of FIG. 5) and superimposing the segmented foreground of the image of the travel participant over the streamed video 704 received from the travel volunteer. A snapshot of the segmented image of the travel participant superimposed over the streamed video background can be captured in a manner similar to that described above.

1.3.4 Contextual Implicit Search

Figure 8:
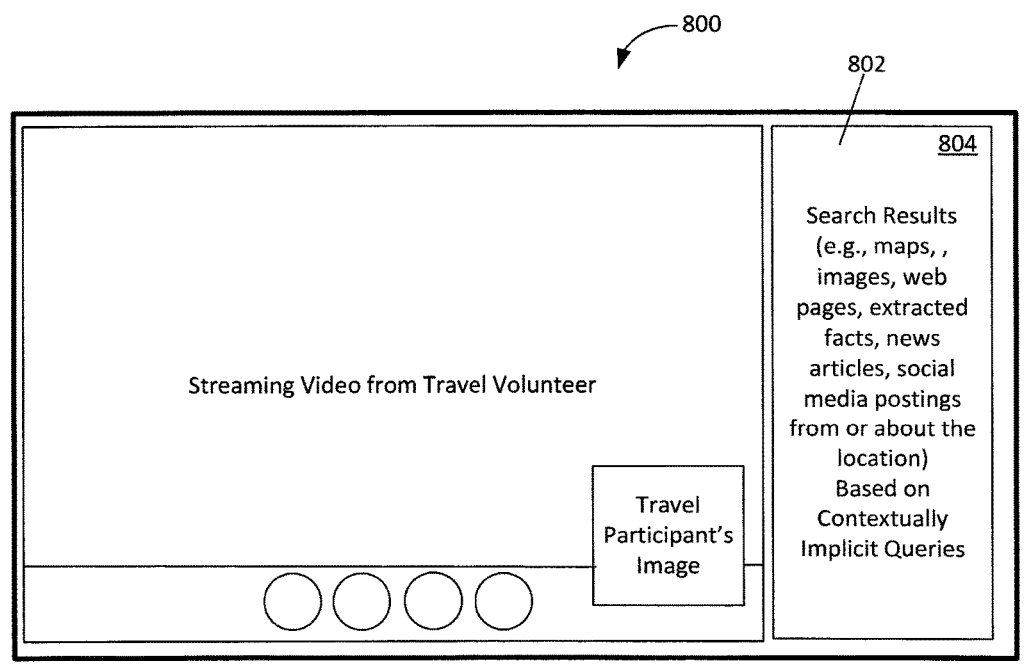
FIG. 8 is an exemplary user interface for obtaining and displaying information about a telepresence experience by using implicit contextual queries employed in various exemplary immersive telepresence implementations.

Various telepresence implementations provide for contextual implicit search that automatically retrieves search results associated with location the travel volunteer visits based on audio associated with the location. Search results associated with the location can automatically be retrieved based on conversations between the telepresence travel participant and the travel volunteer. Alternately search results can be automatically retrieved using text messages or email messages between the travel participant and a travel volunteer. The search results can be displayed in conjunction with the video of the location. Or they can be provided from the telepresence travel participant to the travel volunteer, for example, in real-time as the travel volunteer is capturing and sending audio and video of the location using his or her mobile computing device. FIG. 8 depicts an exemplary user interface 800 that is displayed to the travel participant. The user interface 800 includes a pane 802 where search results 804 in response to an implicit query are displayed on the display of the computing device of the travel participant.

The pane 802 containing the implicitly fetched search results can supplement the travel participant's knowledge of the location, and also provide them with insightful information that they may wish to share with the travel volunteer. The implicit queries can be triggered as described above, as well as by metadata such as any human-typed name for the session or list item (e.g., "the favelas of Rio"), the geo-location being reported by the mobile phone of the travel volunteer, or live speech-to-text translation of any commentary from the travel volunteer, supplemented by entity extraction. In one implementation the implicit query pane provides a combination of images, text, social media posts, and maps that are relevant to the target location and topics.

1.3.5 Real-Time Map

Some immersive telepresence implementations provide a real-time map of the travel volunteer's real-time location. If available, an interactive Street View centered on the travel volunteer's location can also be displayed. The map can enable the travel participant to contribute to the travel volunteer's experience, for example by offering directions to specific locations or pointing out nearby attractions the travel volunteer might not be aware of. The additional Street View increases immersion, offering travel participants a way to explore other views of the same space in a self-driven manner, be it different viewing angles or different times of day and year.

1.4 Travel Volunteer Variations

In the implementations described above the travel participant and the travel volunteers are human beings each equipped with computing devices. However, a travel volunteer could also be a mobile telepresence robot, although such a robot would also be restricted to travelling only in places accessible to a robot (non-paved terrain, stairs, etc. would not be possible). Drones could also potentially be used to similar effect. For example, a person can fly their personal hobby drone to the desired location.

2.0 Other Implementations

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the recommendation request implementation described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

Various immersive telepresence implementations are by means, systems processes for providing a telepresence experience for a travel participant. Such a travel participant can be, for example, a homebound or hospital bound person, a student, or virtually anyone that would benefit from participating in an immersive telepresence experience.

As a first example, immersive telepresence implementations are implemented in a system that provides for immersive telepresence experiences. The system includes one or more computing devices, the computing devices being in communication with each other whenever there is a plurality of computing devices, and a computer program having a plurality of sub-programs executable by the one or more computing devices. The one or more computing devices are directed by the sub-programs of the computer program to, receive a list of telepresence experiences a telepresence travel participant wishes to experience, match an experience from the list with the location of a travel volunteer using the location of a mobile computing device of the travel volunteer and calendar information retrieved from the mobile computing device, receive video and associated audio of the telepresence experience from the mobile computing device of the travel volunteer over a network; and output the received video and associated audio of the telepresence experience with features that enhance the immersiveness of the telepresence experience for the telepresence participant.

As a second example, in various implementations, the first example is further modified by means, processes or techniques such that a telepresence experience from the list is matched with a travel volunteer using profile information of the telepresence travel participant.

As a third example, in various implementations, the first example and the second example is further modified by means, processes or techniques such that an experience from the list is matched by allowing a travel participant to browse a list of available telepresence experiences and manually matching a telepresence experience on the list with a travel volunteer.

As a fourth example in various implementations, the first example, the second example or the third example is further modified by means, processes or techniques to allow the telepresence travel participant to communicate with the travel volunteer while the video and associated audio are being captured.

As a fifth example, in various implementations, the first example, the second example, the third example or the fourth example are further modified by means, processes or techniques to include a feature that allows the telepresence travel participant to capture still images of the telepresence experience from the received video.

As a sixth example, in various implementations, the first example, the second example, the third example, the fourth example or the fifth example are further modified by means, processes or techniques to include a feature that automatically creates a scrapbook from multiple captured still images of the telepresence experience.

As a seventh example, in various implementations, the first example, the second example, the third example, the fourth example, the fifth example or the sixth example are further modified by means, processes or techniques to include a feature that displays the received video or a still image from the video as a background behind the telepresence travel participant.

As an eighth example, in various implementations, the first example, the second example, the third example, the fourth example, the fifth example, the sixth example or the seventh example are further modified by means, processes or techniques to include a feature that captures an image of the telepresence travel participant with the received video or images in the background.

As a ninth example, in various implementations, the first example, the second example, the third example, the fourth example, the fifth example, the sixth example, the seventh example or the eighth example is further modified by means, processes or techniques to send the image of the telepresence travel participant with the received video in the background to a social media site.

As a tenth example, in various implementations, the first example, the second example, the third example, the fourth example, the fifth example, the sixth example, the seventh example, the eighth example or the tenth example is further modified by means, processes or techniques to automatically retrieve search results associated with the location of the telepresence experience that are provided to the travel participant.

As an eleventh example, in various implementations, the first example, the second example, the third example, the fourth example, the fifth example, the sixth example, the seventh example, the eighth example, the ninth example or the tenth example is further modified by means, processes or techniques to automatically retrieve search results associated with location the travel volunteer visits based on conversations between the telepresence travel participant and the travel volunteer.

As a twelfth example, in various implementations, the first example, the second example, the third example, the fourth example, the fifth example, the sixth example, the seventh example, the eighth example, the ninth example, the tenth example or the eleventh example is further modified by means, processes or techniques to display search results in conjunction with the video and images of the telepresence experience.

As a thirteenth example, immersive telepresence implementations are implemented in a process that provides for immersive telepresence experiences. The process uses one or more computing devices for: defining a list of telepresence experiences for a telepresence travel participant to visit; matching a telepresence experience from the list to a travel volunteer using calendar information and geographic location retrieved from the travel volunteer's mobile computing device; receiving a notice from a travel volunteer that the travel volunteer is able to capture video and audio of the matched telepresence experience; receiving a response to the notice that the telepresence travel participant would like to receive video and audio of the matched telepresence experience; and receiving video and associated audio of the matched telepresence experience from the mobile computing device of the travel volunteer over a network.

As a fourteenth example, in various implementations, the thirteenth example is further modified by means, processes or techniques to output the received video and associated audio of the matched telepresence experience as an interactive live video and audio stream to the telepresence travel participant.

As a fifteenth example, in various implementations, the thirteenth example or fourteen example is further modified by means, processes or techniques to store the received video and associated audio and outputting the received video and associated video to the telepresence travel participant at a later time.

As a sixteenth example, immersive telepresence implementations are implemented in a system that provides for immersive telepresence experiences. The process uses one or more computing devices, the computing devices being in communication with each other whenever there is a plurality of computing devices. The computer program has a plurality of sub-programs executable by the one or more computing devices, the one or more computing devices being directed by the sub-programs of the computer program to, receive a list of telepresence experiences for a telepresence travel participant to visit; match a telepresence experience from the list of places with a travel volunteer at a point in time using calendar information retrieved from a computing device of the travel volunteer; receive video and associated audio of the matched telepresence experience from the travel volunteer over a network; and output the received video and associated audio of the matched telepresence experience to the telepresence travel participant.

As a seventeenth example, in various implementations, the sixteenth example is further modified by means, processes or techniques to extract location information from the calendar information and use it in matching.

As an eighteenth example, in various implementations, the sixteenth example or the seventeenth example is further modified by means, processes or techniques to extract geographic location information from the computing device of the travel volunteer and use it in matching.

As a nineteenth example, in various implementations, the sixteenth example, the seventeenth example or the eighteenth example is further modified by means, processes or techniques so that a third party specifies the list of places for the telepresence participant to visit.

As a twentieth example, in various implementations, the sixteenth example, the seventeenth example, the eighteenth example or the nineteenth example is further modified by means, processes or techniques so that the travel volunteer is selected from a set of several travel volunteers by determining the best match.

3.0 Exemplary Operating Environment

Figure 9:
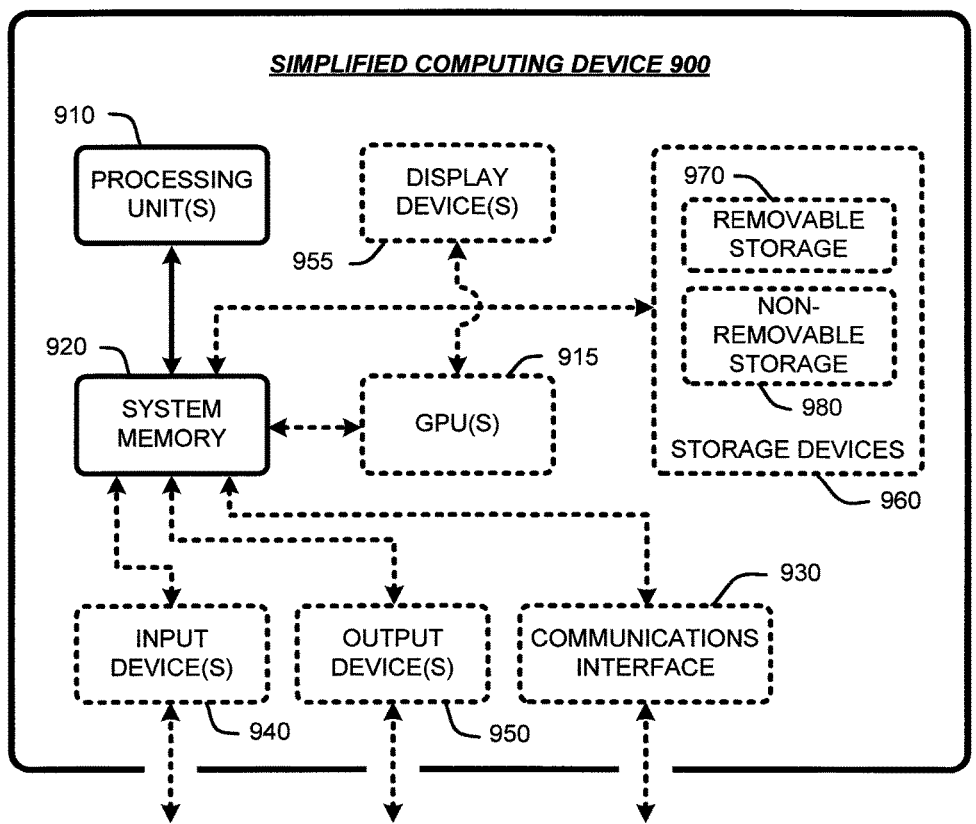
FIG. 9 is an exemplary computing system that can be used to practice exemplary immersive telepresence implementations described herein.

The immersive telepresence implementations described herein are operational within numerous types of general purpose or special purpose computing system environments or configurations. FIG. 9 illustrates a simplified example of a general-purpose computer system on which various elements of the immersive telepresence implementations, as described herein, may be implemented. It is noted that any boxes that are represented by broken or dashed lines in the simplified computing device 900 shown in FIG. 9 represent alternate implementations of the simplified computing device. As described below, any or all of these alternate implementations may be used in combination with other alternate implementations that are described throughout this document.

The simplified computing device 900 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the immersive telepresence implementations described herein, the device should have a sufficient computational capability and system memory to enable basic computational operations. In particular, the computational capability of the simplified computing device 900 shown in FIG. 9 is generally illustrated by one or more processing unit(s) 910, and may also include one or more graphics processing units (GPUs) 915, either or both in communication with system memory 920. Note that that the processing unit(s) 910 of the simplified computing device 900 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 900 may also include other components, such as, for example, a communications interface 930. The simplified computing device 900 may also include one or more conventional computer input devices 940 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 900 and with any other component or feature of the immersive telepresence implementation, including input, output, control, feedback, and response to one or more users or other devices or systems associated with the immersive telepresence implementation, are enabled by a variety of Natural User Interface (NUI) scenarios. The NUI techniques and scenarios enabled by the immersive telepresence implementation include, but are not limited to, interface technologies that allow one or more users user to interact with the immersive telepresence implementation in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 940 or system sensors. Such NUI implementations are also enabled by the use of various techniques including, but not limited to, information derived from system sensors or other input devices 940 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the immersive telepresence implementations.

However, it should be understood that the aforementioned exemplary NUI scenarios may be further augmented by combining the use of artificial constraints or additional signals with any combination of NUI inputs. Such artificial constraints or additional signals may be imposed or generated by input devices 940 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the immersive telepresence implementations.

The simplified computing device 900 may also include other optional components such as one or more conventional computer output devices 950 (e.g., display device(s) 955, audio output devices, video output devices, devices for transmitting wired or wireless data transmissions, and the like). Note that typical communications interfaces 930, input devices 940, output devices 950, and storage devices 960 for general-purpose computers are well known to those skilled in the art, and will not be described in detail herein.

The simplified computing device 900 shown in FIG. 9 may also include a variety of computer-readable media. Computer-readable media can be any available media that can be accessed by the computing device 900 via storage devices 960, and include both volatile and nonvolatile media that is either removable 970 and/or non-removable 980, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blue-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various immersive telepresence implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The immersive telepresence implementations described herein may be further described in the general context of computer-executable instructions, such as program modules, being executed by a computing device. Generally, program modules include routines, programs, objects, components, data structures, and the like, that perform particular tasks or implement particular abstract data types. The immersive telepresence implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

The foregoing description of the immersive telepresence implementations have been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the recommendation request implementation. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A system for providing immersive telepresence, comprising:
    one or more computing devices, said computing devices being in communication with each other whenever there is a plurality of computing devices, and a computer program having a plurality of sub-programs executable by the one or more computing devices, the one or more computing devices being directed by the sub-programs of the computer program to,
    receive a list of telepresence experiences a telepresence travel participant wishes to experience;
    match an experience from the list with the location of a travel volunteer using the location of a mobile computing device of the travel volunteer and calendar information retrieved from the mobile computing device;
    receive video and associated audio of the telepresence experience from the mobile computing device of the travel volunteer over a network; and
    output the received video and associated audio of the telepresence experience with features that enhance the immersiveness of the telepresence experience for the telepresence participant.

2. The system of claim 1, wherein the sub-program for matching a telepresence experience from the list with a travel volunteer uses profile information of the telepresence travel participant.

3. The system of claim 1, wherein the sub-program for matching an experience from the list allows a travel participant to browse a list of available telepresence experiences and manually match a telepresence experience on the list with a travel volunteer.

4. The system of claim 1, further comprising a sub-program that allows the telepresence travel participant to communicate with the travel volunteer while the video and associated audio are being captured.

5. The system of claim 1, further comprising a sub-program that comprises a feature that allows the telepresence travel participant to capture still images of the telepresence experience from the received video.

6. The system of claim 5, further comprising a sub-program that comprises a feature that automatically creates a scrapbook from multiple captured still images of the telepresence experience.

7. The system of claim 1, further comprising a sub-program that comprises a feature that displays the received video or a still image from the video as a background behind the telepresence travel participant.

8. The system of claim 7, further comprising a sub-program that comprises a feature that captures an image of the telepresence travel participant with the received video or images in the background.

9. The system of claim 8, further comprising a sub-program that sends the image of the telepresence travel participant with the received video in the background to a social media site.

10. The system of claim 1, further comprising a sub-program that automatically retrieves search results associated with the location of the telepresence experience that are provided to the travel participant.

11. The system of claim 1, further comprising a sub-program that automatically retrieves search results associated with location the travel volunteer visits based on conversations between the telepresence travel participant and the travel volunteer.

12. The system of claim 11, further comprising a sub-program that displays the search results in conjunction with the video and images of the telepresence experience.

13. A process for providing immersive telepresence, comprising:
    using one or more computing devices for:
        defining a list of telepresence experiences for a telepresence travel participant to visit;
        matching a telepresence experience from the list to a travel volunteer using calendar information and geographic location retrieved from the travel volunteer's mobile computing device;
        receiving a notice from a travel volunteer that the travel volunteer is able to capture video and audio of the matched telepresence experience;
        receiving a response to the notice that the telepresence travel participant would like to receive video and audio of the matched telepresence experience; and
        receiving video and associated audio of the matched telepresence experience from the mobile computing device of the travel volunteer over a network.

14. The process of claim 13, further comprising,
outputting the received video and associated audio of the matched telepresence experience as an interactive live video and audio stream to the telepresence travel participant.

15. The process of claim 13, further comprising, storing the received video and associated audio and outputting the received video and associated video to the telepresence travel participant at a later time.

16. A system for providing immersive telepresence travel, comprising:
one or more computing devices, said computing devices being in communication with each other whenever there is a plurality of computing devices, and a computer program having a plurality of sub-programs executable by the one or more computing devices, the one or more computing devices being directed by the sub-programs of the computer program to,
receive a list of telepresence experiences for a telepresence travel participant to visit;
match a telepresence experience from the list of places with a travel volunteer at a point in time using calendar information retrieved from a computing device of the travel volunteer;
receive video and associated audio of the matched telepresence experience from the travel volunteer over a network; and
output the received video and associated audio of the matched telepresence experience to the telepresence travel participant.

17. The system of claim 16, wherein the sub-program to match extracts location information from the calendar information and uses it in matching.

18. The system of claim 16, wherein the sub-program to match extracts geographic location information from the computing device of the travel volunteer and uses it in matching.

19. The system of claim 16, wherein a third party specifies the list of places for the telepresence participant to visit.

20. The system of claim 16, wherein the sub-program to match selects the travel volunteer from a set of several travel volunteers by determining the best match.

* * * * *